(12) United States Patent
Hijazi et al.

(10) Patent No.: US 8,656,193 B2
(45) Date of Patent: Feb. 18, 2014

(54) POWER MODULE FOR INFORMATION HANDLING SYSTEM AND METHODS THEREOF

(75) Inventors: Mohammed Hijazi, Austin, TX (US); Andrew T. Sultenfuss, Leander, TX (US); Joseph A. Clegg, Round Rock, TX (US); Merle J. Wood, Hutto, TX (US)

(73) Assignee: Dell Products, LP, Round Rock, TX (US)

( * ) Notice: Subject to any disclaimer, the term of this patent is extended or adjusted under 35 U.S.C. 154(b) by 460 days.

(21) Appl. No.: 12/707,176

(22) Filed: Feb. 17, 2010

(65) Prior Publication Data

US 2011/0202777 A1 Aug. 18, 2011

(51) Int. Cl.
*G06F 1/00* (2006.01)

(52) U.S. Cl.
USPC .......................................... 713/300; 713/340

(58) Field of Classification Search
USPC .................................................. 713/300, 340
See application file for complete search history.

(56) References Cited

U.S. PATENT DOCUMENTS

| 4,475,047 | A | * | 10/1984 | Ebert, Jr. ........................ 307/66 |
| 5,598,567 | A | * | 1/1997 | Ninomiya ..................... 713/310 |
| 5,734,254 | A | | 3/1998 | Stephens |
| 5,983,073 | A | | 11/1999 | Ditzik |
| 6,380,714 | B1 | | 4/2002 | Chou |
| 6,498,458 | B1 | | 12/2002 | Chen |
| 6,798,716 | B1 | | 9/2004 | Charych |
| 6,967,462 | B1 | * | 11/2005 | Landis ........................... 320/101 |
| 8,046,619 | B2 | * | 10/2011 | Newland et al. .............. 713/340 |
| 2004/0130915 | A1 | * | 7/2004 | Baarman ..................... 363/21.02 |
| 2006/0103355 | A1 | * | 5/2006 | Patino et al. .................. 320/138 |
| 2006/0284593 | A1 | * | 12/2006 | Nagy et al. .................... 320/109 |
| 2007/0021140 | A1 | * | 1/2007 | Keyes et al. .................. 455/522 |
| 2007/0024238 | A1 | * | 2/2007 | Nakade et al. ................ 320/108 |
| 2007/0096691 | A1 | | 5/2007 | Duncan et al. |
| 2007/0178945 | A1 | * | 8/2007 | Cook et al. .................... 455/572 |
| 2009/0254766 | A1 | * | 10/2009 | Yamasuge ..................... 713/300 |
| 2009/0271047 | A1 | * | 10/2009 | Wakamatsu .................. 700/295 |
| 2009/0322158 | A1 | * | 12/2009 | Stevens et al. ................ 307/104 |
| 2010/0218009 | A1 | * | 8/2010 | Hoeksel et al. ............... 713/300 |
| 2010/0306558 | A1 | * | 12/2010 | Kang ............................. 713/300 |
| 2011/0133691 | A1 | * | 6/2011 | Hautanen ...................... 320/108 |
| 2011/0179292 | A1 | * | 7/2011 | Clegg et al. ................... 713/300 |

OTHER PUBLICATIONS

Hochman Paul, How Green is Wireless Electricity?, Feb. 1 2009, http://www.fastcompany.com/magazine/132/big-green-and-juicy.html.*
Blanco Sebastian, Report: Nissan Bringing Wireless Charging to Electric Cars, Jul. 20, 2009, http://green.autoblog.com/2009/07/20/report-nissan-bringing-wireless-charging-to-electric-cars/.*
Ganapathi Priya, Wireless Chargers Puff Up Their Green Credentials, Feb. 2, 2009, http://www.wired.com/gadgetlab/2009/02/wireless-charge/.*

* cited by examiner

*Primary Examiner* — Mark Connolly
(74) *Attorney, Agent, or Firm* — Larson Newman, LLP

(57) ABSTRACT

An information handling system can receive power from a wireless or wired power source. In response to determining the information handling system is coupled to the wired power source, the system decouples the wireless power source from providing power. In response to the system being decoupled from the wired power source, the information handling system couples the wireless power source to the system.

11 Claims, 4 Drawing Sheets

POWER MODULE FOR INFORMATION HANDLING SYSTEM AND METHODS THEREOF

FIELD OF THE DISCLOSURE

This disclosure relates generally to information handling systems, and more particularly to power modules for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
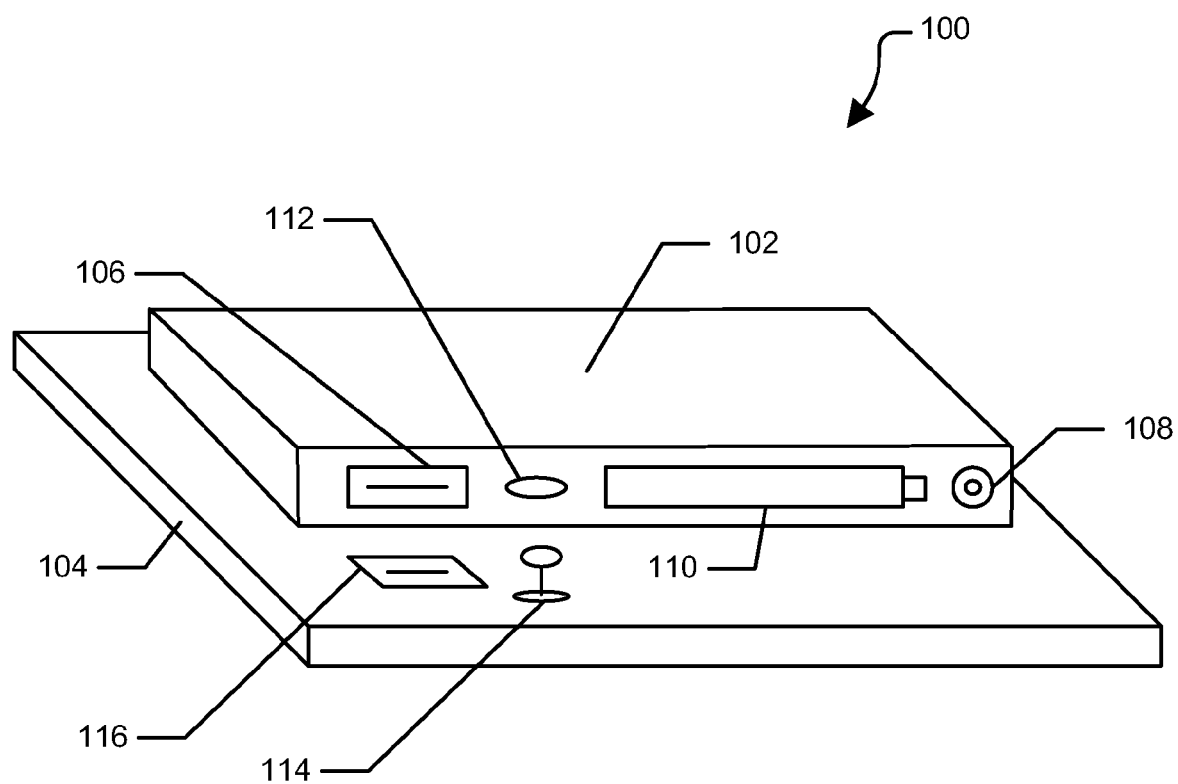
FIG. 1 illustrates a block diagram of a wireless power system for an information handling system according to one aspect of the present disclosure.

FIG. 1 illustrates a block diagram of a wireless power system 100 for an information handling system 102 in accordance with one embodiment of the present disclosure. The wireless power system 102 includes a wireless charger base station 104 having a wireless power node 116 and a mechanical switch activator 114. The information handling system 102 includes a wireless power node 106, a wired power connector 108, a mechanical switch 112, and a battery pack 110.

In operation, the wireless charger base station 104 is operable to provide power wirelessly to the information handling system 102. As used herein, a wireless power source transfers power in any way such that power is transferred without interconnecting wires or cables. It will be appreciated that a wireless power source can employ wires or other solid conductors to itself draw power. For example, the wireless charger base station 104 can draw power from an alternating current (AC) power source, such as a wall outlet, via an AC power adapter (not shown). The wireless charger base station 104 can convert a portion of the power drawn from the AC power source to wireless power provided via the wireless power node 106. The wireless charger base station 104 can use one or more techniques to provide power wirelessly, including inductive techniques, resonant inductive techniques, capacitive transfer techniques, beamed power transfer, such as laser or microwave transfer, or the like. For purposes of discussion, it is assumed that the wireless base station charger 104 transfers power wirelessly using inductive power transfer. The power is provided via wireless power node 116

The wireless power node 106 of the information handling system 102 is configured to receive power via wireless power transfer from the wireless power node 116. In an embodiment, in order for power transfer between the nodes 106 and 116 to occur, the information handling system 102 must be placed such that the nodes are in sufficient proximity. For example, in an embodiment node 106 and node 116 each represent the winding of an inductor, such that power can be transferred between the nodes when the respective windings are placed in sufficient proximity. In the illustrated embodiment, it is assumed that wireless power transfer can be effectuated when the information handling system 102 is placed on the wireless base station charger 104 such that the mechanical switch actuator 114 triggers the mechanical switch 112. In response, the information handling system 102 determines that power is available wirelessly via the wireless power node 106.

The information handling system 102 is operable to determine which power sources are available to provide power, and select the power source that will most efficiently provide power to one or more system modules. For example, the information handling system 102 can determine, based on the state of the mechanical switch 112, whether power is available via wireless power node 106. Further, the information handling system 112 can determine whether the wired power connector 108 is connected to a wired power source, such as a wall outlet, via an AC adapter or other wired connector. In response to determining that power is available via either source, the information handling system 102 can select the source that will more efficiently provide power to one or more modules of the system. The information handling system 102 can couple the selected power source to the one or more modules and decouple the other power source so that it does not provide power to the modules. For example, wired power can typically be provided more efficiently than wireless power. Accordingly, in response to determining that power is available via both the wired power connector 108 and the wireless power node 106, the information handling system 108 can couple the wired power connector to one or more system modules so that power is provided to the modules by the wired power source. In another embodiment, if wireless power can be provided more efficiently that wired power, the information handling system 102 can couple the wireless power node 106 to the system modules for provision of power.

Further, the information handling system 102 can determine when a power source is no longer available, and in response couple an alternate power source to the system modules. For example, as explained above the information handling system 102 can select the wired power connector 108 to provide power to the system modules based on the wired power source's likelihood of providing power more efficiently. In response to determining the wired power source has been removed (for example, the AC adapter has been unplugged), the information handling system 102 can couple the wireless power node 106 to the system modules, so that power is provided wirelessly.

Figure 2:
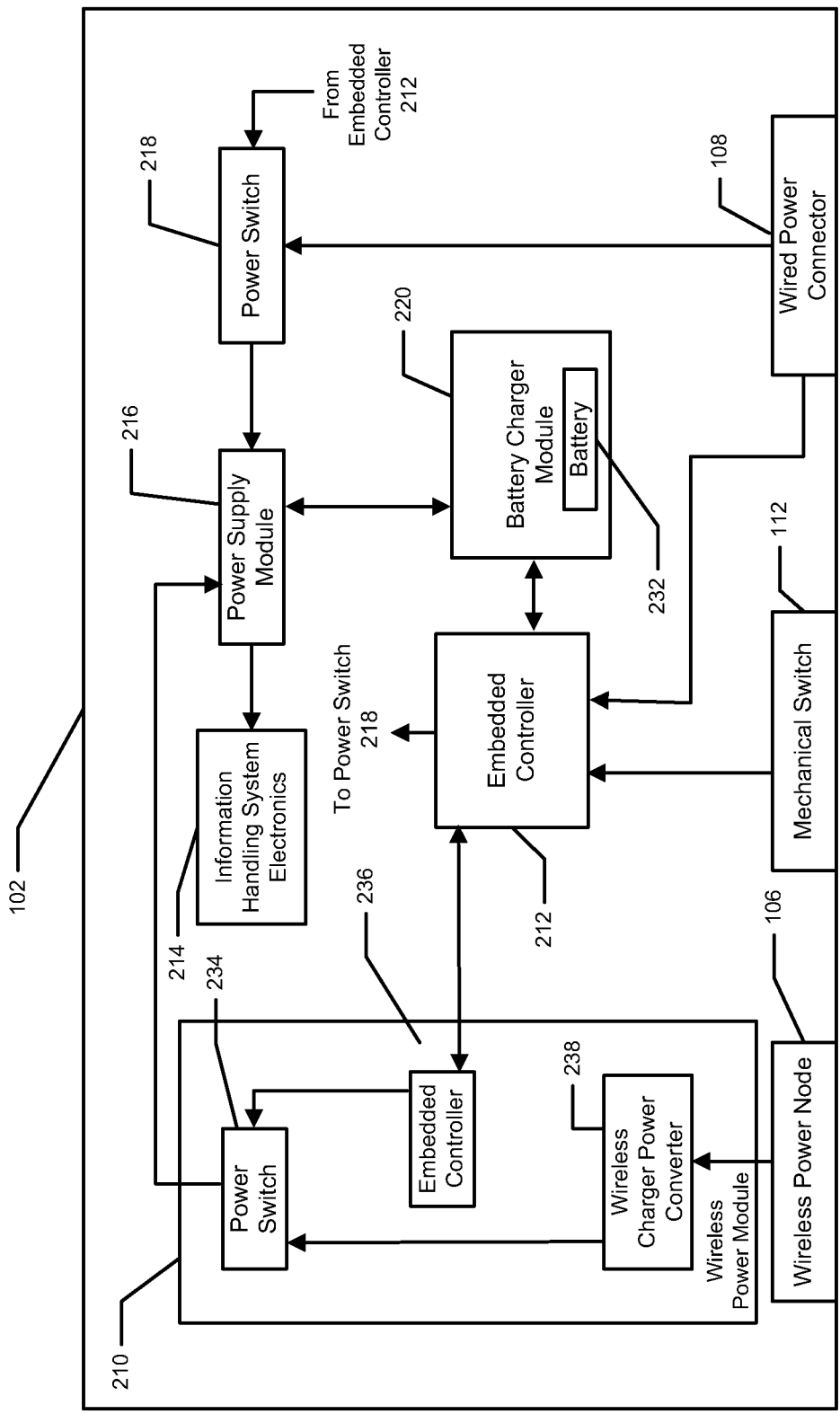
FIG. 2 illustrates a block diagram of the information handling system of FIG. 1 in accordance with one embodiment of the present disclosure.

FIG. 2 illustrates a block diagram of a particular embodiment of the information handling system 102 of FIG. 1. In the illustrated embodiment, the information handling system 102 includes a wireless power module 210, the wireless power node 106, the mechanical switch 112, the wired power connector 108, a power switch 218, a power supply module 216, a battery charger module 220 including a battery 232, an embedded controller 214, and information handling system electronics 214. The wireless power module 210 includes a power switch 234, a wireless charger power converter 238, and an embedded controller 236.

The information handling system electronics included the processor devices, memory devices, input/output devices, and other modules that perform the tasks of the information handling system 102 during normal operation. The embedded controller 212 is a processor device operable to determine which power sources are available to power the information handling system electronics 214, and control the power switches 218 and 234 to couple the available power source that is likely to be more efficient in providing power.

To illustrate, the embedded controller 212 is operable to determine whether power is available at the wireless power node 106 based on a state of the mechanical switch 224. In another embodiment, the embedded controller 212 can determine whether power is available by sensing a voltage or current provided via the wireless power module 210. In addition, the embedded controller 212 can determine whether wired power is available by determining if a voltage or current is being provided at wired power connector 108. In response to determining that power is available from a wireless power source via the wireless power node 106 and is also available from a wired power source via the wireless power connector 108, the embedded controller 212 can select the power source that is predicted or likely to supply power more efficiently to the information handling system electronics 214. In one embodiment, the embedded controller 212 selects the power source based on a predetermined hierarchy of power sources. For example a non-volatile memory (not shown) can store a list of potential power sources, and indicate, via the list order or other information, which of the potential power sources are predicted to be more efficient. In other embodiment, the embedded controller 212 can sense a voltage or current supplied by each power source and determine the likely efficiency of each source.

In response to selecting one of the power sources, the embedded controller controls the power switch 218 and the power switch 234 to couple the selected power source to the information handling system electronics. For example, in response to selecting the wired power source, the embedded controller 212 sends a signal to the power switch 218 to couple the wired power connector 108 to the power supply module 216. In addition, the embedded controller 212 sends a request to the embedded controller 236 requesting that the wireless charger power converter 238 be decoupled from the power supply module 216. The embedded controller 236 is a processor device operable to respond to requests from embedded controller 212 to control operation of the power switch 234. Accordingly, in response to the request from embedded controller 212, embedded controller 236 controls power switch 234 so that the wireless charger power converter 238 is decoupled from power supply module 216. Thus, power is supplied to power supply module 216 from the wired power source via wired power connector 108.

The power supply module 216 is a module operable to condition received power for supply to the information handling system electronics 214. For example, the power supply module 216 can regulate the voltage, current, or other characteristic of supplied power, or any combination thereof. In addition, the power supply module can regulate any spikes or other signal perturbations resulting from a change in the power source. To illustrate, the embedded controller 212 can determine if the wired power source has been removed, such as by disconnection of a power cable. In response, the embedded controller 212 can control the power switches 218 and 234 to decouple the wired power connector 108 from the power supply module 216 and couple the wireless charger power converter 238 to the power supply module. The wireless charger power converter converts power provided by the wireless power node 106 to wired power sufficient for transmission to the power supply module 216. Thus, in response to determining the wired power source has been removed, the embedded controller can change the source of supplied power to a wireless power source. The power supply module 216 regulates the change in power source such that the change does not result in harmful power spikes or other signal perturbations.

In addition, the power supply module 216 can supply power to the batter charger module 220 from either power source selected by the embedded controller 212. In response, the battery charger module charges the battery 232. Thus, the battery 232 can be charged by either the wired power source or the wireless power source.

Moreover, in one embodiment, the battery charger module 220 can provide power from the battery 232 to the power supply module 216 to power the information handling system electronics 214. For example, if the embedded controller 212 determines that power is not available from either the wired power source or the wireless power source, the embedded controller 212 can instruct the battery charger module 220 to provide power from the battery 232 to that power supply module 216, which in turn supplies power to the information handling system electronics 214.

In some embodiments, the battery 232 can supply power more efficiently that the wireless power source, so long as the battery 232 has a sufficient charge. Accordingly, the embedded controller 212 can determine when only the wireless power source and battery are available to supply power. In response, the embedded controller 212 monitors the relative state of charge (RSOC) of the battery 232 and, as long as the RSOC remains above a charging threshold, controls the power switch 234 so that power is not supplied from the wireless power source. In response to determining that the RSOC of battery 232 is below the charging threshold, the embedded controller 212 instructs the battery charger module to stop providing power to power supply module 216. In addition, the embedded controller 212 controls the power switch 234 so that the wireless power source, provided by wireless power node 106, is coupled to the power supply module 216. Power is therefore supplied to the information handling system electronics 214 by the wireless power source when the RSOC of battery 232 is below the charging threshold. Further, the power supply module 216 can employ a portion of the power supplied wirelessly to charge the battery 232. Once the RSOC of battery 232 is at or above a charging threshold, the embedded controller 212 can control information handling system 102 so that power is again supplied by the battery 232, rather than by the wireless power source.

This can be better understood with reference to an example. Assume that the charging threshold of battery 232 is 20 percent charge, while the supply threshold is 80 percent charge. The embedded controller 212 will ensure that the battery 232 will supply power to the information handling system electronics 214 until the RSOC of the battery 232 falls below 20 percent. Once the RSOC falls below this threshold, embedded controller 212 ensures that power is provided to the information handling system electronics 214 via the wireless power source. The embedded controller 212 also ensures that the battery 232 is charged via the wireless power source. Once the RSOC of the batter 232 rises above 80 percent charge, the embedded controller 212 decouples the wireless power source from the information handling system electronics 214 and ensures that power is again supplied by the battery 232.

Figure 3:
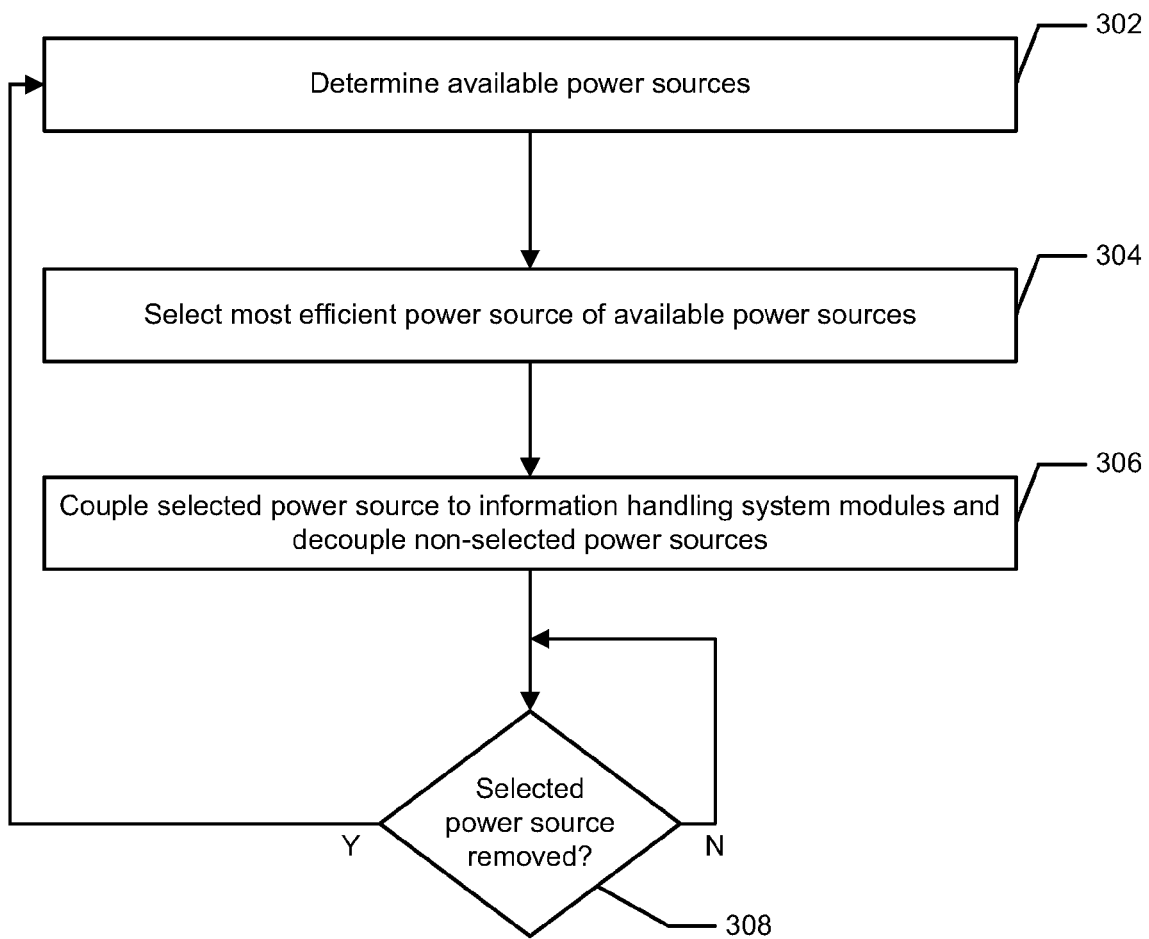
FIG. 3 illustrates a flow diagram of a method of selecting a power source for an information handling system in accordance with one embodiment of the present disclosure.

FIG. 3 illustrates a flow diagram of a method of selecting a power source for an information handling system in accordance with one embodiment of the present disclosure. At block 302, an embedded controller of the information handling system determines sources of power available to the system. A power source is available if it is able to supply power to the system. For example a wired power connector that is not connected to a wired power source, such as an AC outlet, is not an available power source because it is not able to supply power. In the example of FIG. 3, it is assumed that a wired power source and a wireless power source are both available power sources.

At block 304, the embedded controller selects the available power source that is likely to most efficiently supply power to modules of the information handling system. For example, in some embodiments the wired power source is likely to be more efficient in supplying power than the wireless power source. Accordingly, the embedded controller will select the wired power source. In other embodiments, the wireless power source may be more efficient, and may be selected by the embedded controller over the wired power source.

At block 306, the embedded controller couples the selected power source to the modules of the information handling system, such as processor devices, memory devices, input/output devices, and the like. In addition, the embedded controller decouples the power sources that were not selected from the system modules. At block 308, the embedded controller determines whether the selected power source has been removed, such that it is no longer available as a power source. If so, the method flow returns to block 302 so that the embedded controller can select an alternate power source. For example, if the wired power source was selected, and it is removed as a power source, the embedded controller can select the wireless power source to supply power. It will be appreciated that a battery of the information handling system can temporarily supply power to the system while the embedded controller switches the power source to the wireless power source.

Figure 4:
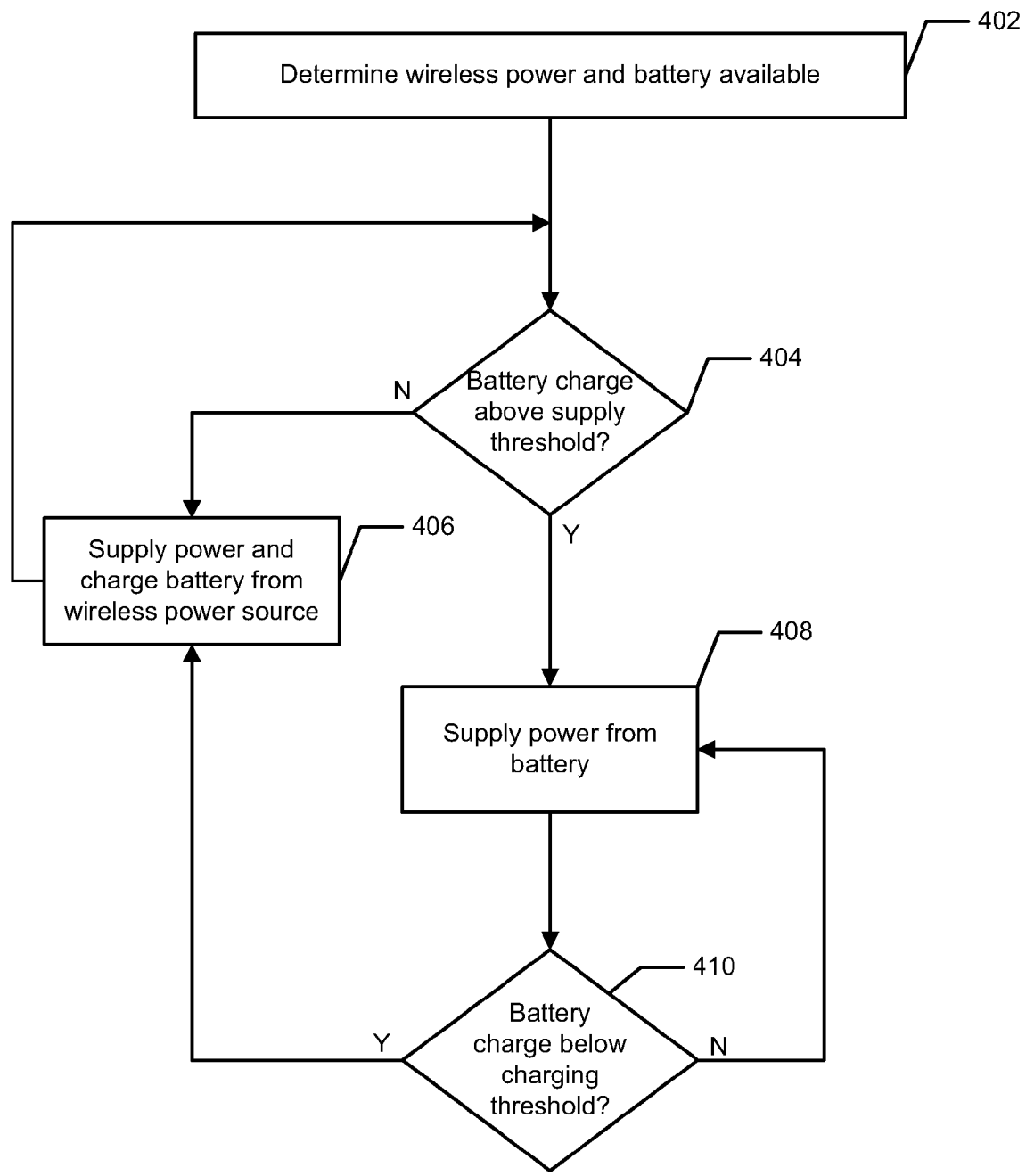
FIG. 4 illustrates a flow diagram of a method of selecting a power source for an information handling system in accordance with another embodiment of the present disclosure.

FIG. 4 illustrates a flow diagram of a method of selecting a power source for an information handling system in accordance with another embodiment of the present disclosure. At block 402, an embedded controller of the information handling system determines that a wireless power source and a battery are the sources of power available to the system. In response, at block 404, the embedded controller determines whether a charge level of the battery is above a designated threshold whereby the battery is available to supply power. For purposes of discussion, this threshold is referred to as a supply threshold. In response to determining the battery charge is not above the supply threshold, the method flow proceeds to block 406 and the embedded controller ensures that power is supplied to information handling system modules from the wireless power source. In addition, the wireless power source is employed to charge that battery until the battery charge is above the supply threshold.

If, at block 404, the battery charge is above the supply threshold, the method flow moves to block 408 and the embedded controller ensures that power is supplied from the system modules by the battery. The method flow proceeds to block 410, and the embedded controller determines if the battery charge is below another designated threshold, referred to as a charging threshold. If not, the method flow returns to block 408 and the battery continues to supply power until its charge is below the charging threshold. Once the battery charge is below the charging threshold, the method flow moves from block 410 to block 406, and the embedded controller ensures that power is supplied and the battery is charged from the wireless power source.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving power from a wireless power source at a first power module of an information handling system;
   receiving power from a battery at a second power module of the information handling system;
   determining a threshold for a state of charge of the battery, wherein the threshold is based on an efficiency of the wireless power source and on an efficiency of the battery;
   providing power to the information handling system from only the second power module; and
   in response to the state of charge of the battery being below threshold, providing power from only the first power module to the information handling system.

2. The method of claim 1, wherein the second power module comprises a battery charging module of the information handling system.

3. The method of claim 1, wherein the information handling system comprises a processor device.

4. The method of claim 1, further comprising:
   in response to determining the information handling system is not receiving power from the battery, providing power from the first power module to the information handling system.

5. The method of claim 1, wherein providing power from the first power module to the information handling system comprises coupling the first power module to the information handling system based on the state of a mechanical switch.

6. A method, comprising:
   determining at an information handling system which of a plurality of power sources are available to provide power to the information handling system, the plurality of power sources comprising a battery and a wireless power source;
   providing power only from the battery to the information handling system;
   determining a threshold for a relative state of charge of the battery based on the efficiency of the battery and on the efficiency of the wireless power source;
   selecting the wireless power source in response to the relative state of charge of the battery being below the threshold; and
   providing power only from the wireless power source to the information handling system in response to selecting the wireless power source when the information handling system is connected to the battery.

7. The method of claim 6, wherein the information handling system comprises a battery charger.

8. The method of claim 6, wherein the information handling system comprises a processor device.

9. The method of claim 6, further comprising providing power from the battery to the information handling system in response to determining the state of charge of the battery is above the threshold.

10. An information handling system comprising:
    a wireless power module operable to receive power from a wireless power source;
    a battery;
    a power switch coupled to the wireless power module and to the battery;
    a system module coupled to the power switch; and
    a control module coupled to the power switch, the control module operable to:
       control the power switch to couple the wireless power module to the system module when a state of charge of the battery is below a threshold, wherein the threshold is based on an efficiency of the wireless power source and on an efficiency of the battery; and
       control the power switch to couple the battery to the system module when the state of charge of the battery is above the threshold.

11. The information handling system of claim 10, wherein the control module is operable to determine the wireless power module is available to supply power based on the state of a mechanical switch.

* * * * *